Aug. 24, 1943.     W. A. COUPANGER     2,327,403
TREE HOLDER
Filed Oct. 16, 1942
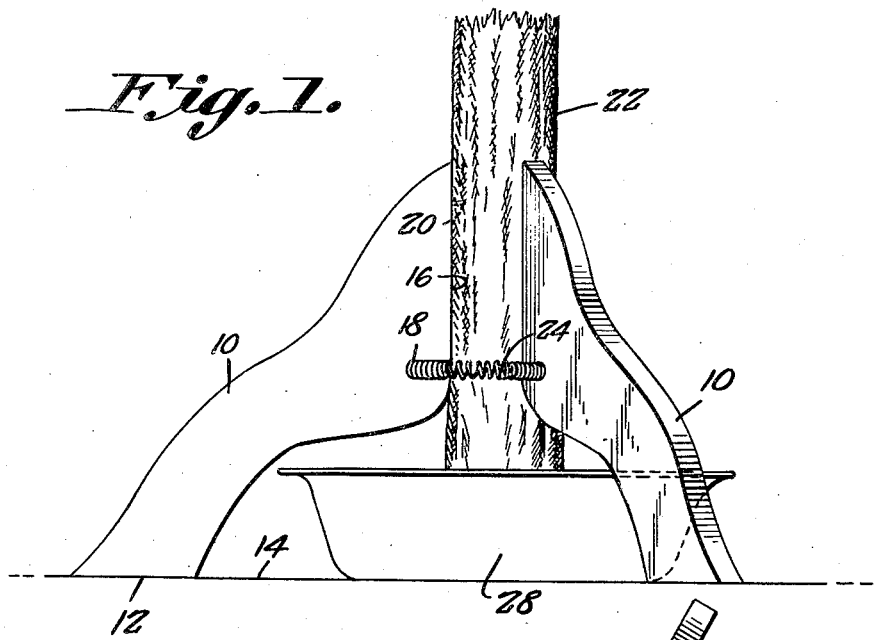
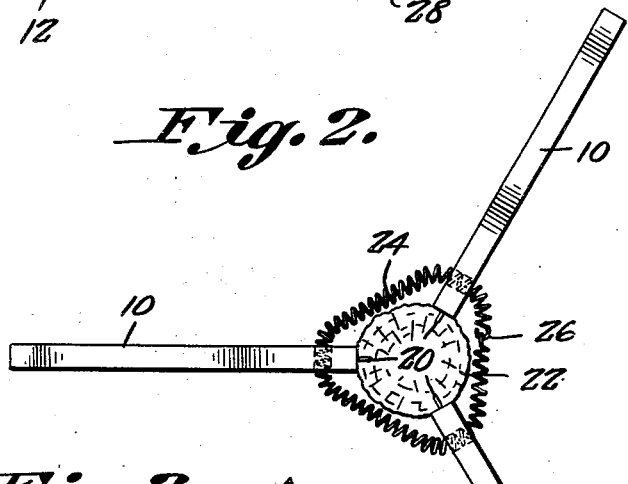
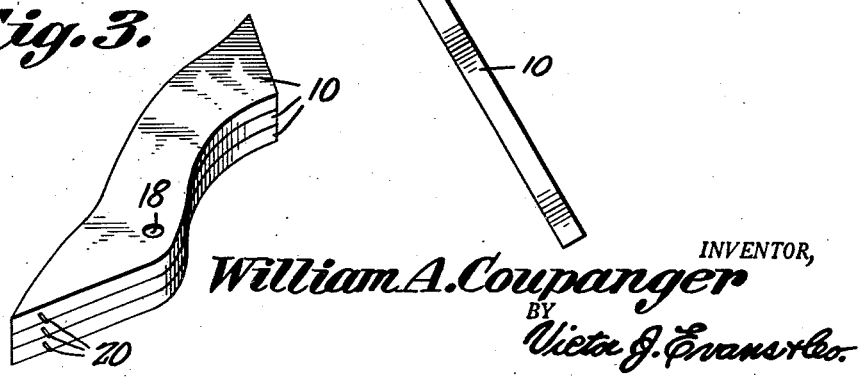
INVENTOR,
William A. Coupanger
BY
Victor J. Evans & Co.
ATTORNEYS Patented Aug. 24, 1943

2,327,403

UNITED STATES PATENT OFFICE 2,327,403

TREE HOLDER

William A. Coupanger, Elmore, Minn.

Application October 16, 1942, Serial No. 462,306

2 Claims. (Cl. 248—47)

My invention relates to temporarily erected upright devices, such as Christmas trees and the like, and has among its objects and advantages the provision of an improved holder.

In the accompanying drawing:

Figure 1 is a side view of a holder.

Figure 2 is a top view, and

Figure 3 is a perspective view of three parts of the holder in folded relationship.

In the embodiment of the invention selected for illustration, I make use of three legs 10 having end faces 12 arranged to rest on the floor 14 or other supporting surface. Each leg includes a tree engaging face 16 arranged at an angle of 90 degrees to its face 12. An opening 18 is also provided in each leg 10.

A small pin 20 is attached to each leg and projects from the face 16 to be embedded in the tree or other device 22 to be supported in an upright position. I prefer to locate the pins 20 close to the upper ends of the faces 16, while the openings 18 are located near the lower ends of the faces. A coiled tension spring 24 is threaded through the openings 18 and connected at its ends, as at 26, so as to exert a pull on the legs 10 to hold the latter firmly against the tree 22.

In practice, the tree 22 may be so supported in the holder as to bring its lower end down sufficiently far to project into a water containing receptacle 28 for prolonging the life of the tree. When not in use, the legs 10 may be arranged face to face in the manner of Figure 3 to provide a small and compact storage bundle.

Without further elaboration, the foregoing will so fully explain my invention, that others may, by applying current knowledge, readily adapt the same for use under various conditions of service.

I claim:

1. A tree holder comprising three legs, each leg having a floor engaging face and a tree engaging face, means projecting from said tree engaging faces to be embedded in the tree and to support the load thereof, the tree engaging faces being of such length as to balance the tree in an upright position, said legs having openings, and resilient tensioning means threaded loosely through said openings for clamping said tree engaging faces against the tree, said legs diverging downwardly from the tree clamped therebetween and being shaped to provide space for a water containing receptacle into which the lower end of the tree may be projected.

2. A tree holder comprising a plurality of legs adapted to rest at their outer ends on the floor, the legs curving upwardly and then inwardly from their outer ends, the inner ends of the legs being elongated in an upward direction to provide long tree engaging faces adapted to balance the tree in a vertical position, pins carried by the inner ends of the legs near the upper ends of said faces for engagement with the tree, the inner ends of the legs being provided near the lower ends of said faces with openings, and a continuous coil spring passing freely through said openings to hold said faces against the tree.

WILLIAM A. COUPANGER.